United States Patent
Madnani et al.

(10) Patent No.: US 9,576,249 B2
(45) Date of Patent: Feb. 21, 2017

(54) SYSTEM AND METHOD FOR AUTOMATED SCORING OF A SUMMARY-WRITING TASK

(71) Applicant: Educational Testing Service, Princeton, NJ (US)

(72) Inventors: Nitin Madnani, Princeton, NJ (US); Jill Burstein, Princeton, NJ (US)

(73) Assignee: Educational Testing Service, Princeton, NJ (US)

( * ) Notice: Subject to any disclaimer, the term of this patent is extended or adjusted under 35 U.S.C. 154(b) by 400 days.

(21) Appl. No.: 14/218,309

(22) Filed: Mar. 18, 2014

(65) Prior Publication Data
US 2014/0279763 A1    Sep. 18, 2014

Related U.S. Application Data

(60) Provisional application No. 61/802,808, filed on Mar. 18, 2013.

(51) Int. Cl.
| | | |
|---|---|---|
| G06N 5/00 | (2006.01) | |
| G06F 1/00 | (2006.01) | |
| G06N 99/00 | (2010.01) | |
| G09B 7/00 | (2006.01) | |
| G09B 7/02 | (2006.01) | |
| G06F 17/27 | (2006.01) | |
| G06Q 10/10 | (2012.01) | |

(52) U.S. Cl.
CPC ......... *G06N 99/005* (2013.01); *G06F 17/2745* (2013.01); *G06Q 10/10* (2013.01); *G09B 7/00* (2013.01); *G09B 7/02* (2013.01)

(58) Field of Classification Search
CPC ............ G06N 5/04; G06N 7/005; G06N 5/02; G06Q 50/01
See application file for complete search history.

(56) References Cited

U.S. PATENT DOCUMENTS

| | | | |
|---|---|---|---|
| 2014/0278948 A1* | 9/2014 | Lemphers | G06Q 30/0251 705/14.49 |
| 2015/0095770 A1* | 4/2015 | Mani | G06F 17/2745 715/254 |

OTHER PUBLICATIONS

A comparison of rankings produced by summarization evaluation measure, 2002, Donaway et al.*

(Continued)

*Primary Examiner* — Stanley K Hill
*Assistant Examiner* — Kalpana Bharadwaj
(74) *Attorney, Agent, or Firm* — Jones Day

(57) ABSTRACT

In accordance with the teachings described herein, systems and methods are provided for measuring a user's comprehension of subject matter of a text. A summary generated by the user is received, where the summary summarizes the text. The summary is processed to determine a first numerical measure indicative of a similarity between the summary and a reference summary. The summary is processed to determine a second numerical measure indicative of a degree to which a single sentence of the summary summarizes an entirety of the text. The summary is processed to determine a third numerical measure indicative of a degree of copying in the summary of multi-word sequences present in the text. A numerical model is applied to the first numerical measure, the second numerical measure and the third numerical measure to determine a score for the summary indicative of the user's comprehension of the subject matter of the text.

25 Claims, 8 Drawing Sheets

(56) References Cited

OTHER PUBLICATIONS

Attali, Yigal, Burstein, Jill; Automated Essay Scoring with E-Rater, v.2; Journal of Technology, Learning, and Assessment, 4(3); 2006.

Bean, Thomas, Steenwyk, Fern; The Effect of Three Forms of Summarization Instruction on Sixth Graders' Summary Writing and Comprehension; Journal of Reading Behavior, 16(4); pp. 297-306; 1984.

Burstein, Jill, Tetreault, Joel, Madnani, Nitin; The E-rater Automated Essay Scoring System; Ch. 4, Handbook for Automated Essay Scoring, M. Shermis & J. Burstein (Eds.); Routledge; pp. 55-67; 2013.

Duke, Nell, Pearson, P. David; Effective Practices for Developing Reading Comprehension; Ch. 10 in What Research Has to Say About Reading Instruction, 3rd Edition, A.E. Farstrup & S.J. Samuels (Eds.); pp. 205-242; 2002.

Hall, Mark, Frank, Eibe, Holmes, Geoffrey, Pfahringer, Bernhard, Reutemann, Peter, Witten, Ian; The WEKA Data Mining Software: An Update; SIGKDD Explorations, 11(1); pp. 10-18; 2009.

Lin, Chin-Yew, How, Eduard; Automatic Evaluation of Summaries Using N-gram Co-Occurrence Statistics; Proceedings of the Human Technology Conference; pp. 71-78; 2003.

Papineni, Kishore, Roukos, Salim, Ward, Todd, Zhu, Wei-Jing; BLEU: a Method for Automatic Evaluation of Machine Translation; Proceedings of the 40th Annual Meeting of the Association for Computational Linguistics; pp. 311-318; 2002.

Armbruster, Bonnie, Anderson, Thomas, Ostertag, Joyce; Teaching Text Structure to Improve Reading and Writing; the Reading Teacher, 43(2); pp. 130-137; Nov. 1989.

Friend, Rosalie; Effects of Strategy Instruction on Summary Writing of College Students; Contemporary Educational Psychology, 26(1); pp. 3-24; 2001.

Gernsbacher, Morton Ann; Two Decades of Structure Building; Discourse Processes, 23(3); pp. 265-304; 1997.

Hill, Margaret; Writing Summaries Promotes Thinking and Learning Across the Curriculum—But Why Are They So Difficult to Write?; Journal of Reading, 34(7); pp. 536-539; Apr. 1991.

Kintsch, W.; Comprehension: A Paradigm for Cognition; Cambridge University Press; 1998.

Nienkova, Ani, McKeown, Kathleen; Automatic Summarization; Foundations and Trends in Information Retrieval, 5 (2-3); pp. 103-233; 2011.

Thiede, Keith, Anderson, Mary; Summarizing Can Improve Metacomprehension Accuracy; Contemporary Educational Psychology, 28(2); pp. 129-160; 2003.

Yu, G.; Reading for Summarization as Reading Comprehension Test Method: Promises and Problems; Language Testing Update, 32; pp. 44-47; 2003.

* cited by examiner

202 Passage

During the Neolithic Age, humans developed agriculture-what we think of as farming. Agriculture meant that people stayed in one place to grow their crops. They stopped moving from place to place to follow herds of animals or to find new wild plants to eat. And because they were settling down, people built permanent shelters. The caves they had found and lived in before could be replaced by houses they built themselves.

To build their houses, the people of this Age often stacked mud bricks together to make rectangular or round buildings. At first, these houses had one big room. Gradually, they changed to include several rooms that could be used for different purposes. People dug pits for cooking inside the houses. They may have filled the pits with water and dropped in hot stones to boil it. You can think of these as the first kitchens.

The emergence of permanent shelters had a dramatic effect on humans. They gave people more protection from the weather and from wild animals. Along with the crops that provided more food than hunting and gathering, permanent housing allowed people to live together in larger communities.

204 Directions

Please write a summary. The first sentence of your summary should be about the whole passage. Then write 3 more sentences. Each sentence should be about one of the paragraphs.

FIG. 2

Grade 4: summary demonstrates excellent global understanding and understanding of all 3 local concepts from the passage; does not include verbatim text (5+ words) copied from the passage; contains no inaccuracies.

Grade 3: summary demonstrates good global understanding and demonstrates understanding of at least 2 local concepts; may or may not include some verbatim text, contains no more than 1 inaccuracy.

Grade 2: summary demonstrates moderate local understanding only (2-3 local concepts but no global); with or without verbatim text, contains no more than 1 inaccuracy; OR good global understanding only with no local concepts.

Grade 1: summary demonstrates minimal local understanding (1 local concept only), with or without verbatim text; OR contains only verbatim text.

Grade 0: summary is off topic, garbage, or demonstrates no understanding of the text; OR response is "I don't know" or "IDK."

FIG. 4

SYSTEM AND METHOD FOR AUTOMATED SCORING OF A SUMMARY-WRITING TASK

CROSS-REFERENCE TO RELATED APPLICATIONS

This application claims priority to U.S. Provisional Patent Application No. 61/802,808, filed Mar. 18, 2013, entitled "Automated Scoring of a Summary-Writing Task Designed to Measure Reading Comprehension," which is herein incorporated by reference in its entirety.

FIELD

The technology described in this patent document relates generally to computer-based test scoring systems and more particularly to a system and method for automatically scoring a constructed response that summarizes a text.

BACKGROUND

To evaluate the understanding, comprehension, or skill of students in an academic environment, the students are tested. Typically, educators rely on multiple-choice examinations to evaluate students. Multiple-choice examinations quickly provide feedback to educators on the students' progress. However, multiple-choice examinations may reward students for recognizing an answer versus constructing or recalling an answer. Thus, another method of evaluating students utilizes test questions that require a constructed response. Examples of constructed responses include free-form, non-multiple choice responses such as essays or show-your-work math responses. For some educators, use of a constructed response examination is preferred versus a multiple-choice examination because the constructed response examination requires the student to understand and articulate concepts in the tested subject matter. However, a length of time required to grade a constructed response may be considerable.

SUMMARY

The present disclosure is directed to a computer-implemented method, system, and non-transitory computer-readable storage medium for measuring a user's comprehension of subject matter of a text. In an example computer-implemented method of measuring a user's comprehension of subject matter of a text, a summary generated by the user is received, where the summary is a constructed response that summarizes the text. The summary is parsed with a processing system to identify a number of sentences contained in the summary and to identify in the summary a plurality of multi-word sequences. The summary and a reference summary are processed with the processing system to determine a first numerical measure indicative of a similarity between the summary and a reference summary, where the reference summary has been designated as representative of the subject matter of the text. The summary is processed with the processing system to determine a second numerical measure indicative of a degree to which a single sentence of the summary summarizes an entirety of the text. The summary and the text are processed with the processing system to determine a third numerical measure indicative of a degree of copying in the summary of multi-word sequences present in the text. A numerical model is applied to the first numerical measure, the second numerical measure and the third numerical measure to determine a score for the summary indicative of the user's comprehension of the subject matter of the text. The numerical model includes a first variable and an associated first weighting factor, the first variable receiving a value of the first numerical measure. The numerical model also includes a second variable and an associated second weighting factor, the first variable receiving a value of the second numerical measure. The numerical model further includes a third variable and an associated third weighting factor, the third variable receiving a value of the third numerical measure.

An example system for measuring a user's comprehension of subject matter of a text includes a processing system and a computer-readable memory in communication with the processing system. The computer-readable memory is encoded with instructions for commanding the processing system to execute steps. In executing the steps, a summary generated by the user is received, where the summary is a constructed response that summarizes the text. The summary is parsed with the processing system to identify a number of sentences contained in the summary and to identify in the summary a plurality of multi-word sequences. The summary and a reference summary are processed with the processing system to determine a first numerical measure indicative of a similarity between the summary and a reference summary, where the reference summary has been designated as representative of the subject matter of the text. The summary is processed with the processing system to determine a second numerical measure indicative of a degree to which a single sentence of the summary summarizes an entirety of the text. The summary and the text are processed with the processing system to determine a third numerical measure indicative of a degree of copying in the summary of multi-word sequences present in the text. A numerical model is applied to the first numerical measure, the second numerical measure and the third numerical measure to determine a score for the summary indicative of the user's comprehension of the subject matter of the text. The numerical model includes a first variable and an associated first weighting factor, the first variable receiving a value of the first numerical measure. The numerical model also includes a second variable and an associated second weighting factor, the first variable receiving a value of the second numerical measure. The numerical model further includes a third variable and an associated third weighting factor, the third variable receiving a value of the third numerical measure.

In an example non-transitory computer-readable storage medium for measuring a user's comprehension of subject matter of a text, the computer-readable storage medium includes computer executable instructions which, when executed, cause a processing system to execute steps. In executing the steps, a summary generated by the user is received, where the summary is a constructed response that summarizes the text. The summary is parsed with the processing system to identify a number of sentences contained in the summary and to identify in the summary a plurality of multi-word sequences. The summary and a reference summary are processed with the processing system to determine a first numerical measure indicative of a similarity between the summary and a reference summary, where the reference summary has been designated as representative of the subject matter of the text. The summary is processed with the processing system to determine a second numerical measure indicative of a degree to which a single sentence of the summary summarizes an entirety of the text. The summary and the text are processed with the processing system to determine a third numerical measure indicative of a degree of copying in the summary of multi-word sequences present in the text. A numerical model is applied to the first numerical measure, the second numerical measure and the third numerical measure to determine a score for the summary indicative of the user's comprehension of the subject matter of the text. The numerical model includes a first variable and an associated first weighting factor, the first variable receiving a value of the first numerical measure. The numerical model also includes a second variable and an associated second weighting factor, the first variable receiving a value of the second numerical measure. The numerical model further includes a third variable and an associated third weighting factor, the third variable receiving a value of the third numerical measure.

The present disclosure is also directed to a computer-implemented method, system, and non-transitory computer-readable storage medium for constructing a numerical model to measure a user's comprehension of subject matter of a text as presented in a summary of the text constructed by a user. In an example computer-implemented method of constructing a numerical model to measure a user's comprehension of subject matter of a text as presented in a summary of the text constructed by a user, a numerical model associated with a given text is specified. The numerical model includes a first variable and an associated first weighting factor, the first variable indicative of a similarity between a summary of the given text constructed by a user and a given reference summary. The numerical model also includes a second variable and an associated second weighting factor, the second variable indicative of a degree to which a single sentence of the summary summarizes an entirety of the given text. The numerical model also includes a third variable and an associated third weighting factor, the third variable indicative of a degree of copying in the summary of multi-word sequences present in the given text. A plurality of reference summaries for the given text are received, each reference summary having been given a reference score. The reference summaries span a range of reference scores reflecting varying degrees of comprehension of the subject matter of the given text. The reference summaries have been accepted as usable for training the numerical model. The numerical model is trained with a processing system using the reference summaries and the given reference scores to determine values for each of the first, second and third weighting factors. The numerical model is configured with the determined values of the first, second and third weighting factors to receive a first numerical measure, a second numerical measure and a third numerical measure for the first variable, second variable and third variable, respectively, of an actual summary to be scored so as to generate a score for the actual summary. The score for the actual summary is indicative of the user's comprehension of the subject matter of the text as presented in a summary of the text.

An example system for constructing a numerical model to measure a user's comprehension of subject matter of a text as presented in a summary of the text constructed by a user includes a processing system and a computer-readable memory in communication with the processing system. The computer-readable memory is encoded with instructions for commanding the processing system to execute steps. In executing the steps, a numerical model associated with a given text is specified. The numerical model includes a first variable and an associated first weighting factor, the first variable indicative of a similarity between a summary of the given text constructed by a user and a given reference summary. The numerical model also includes a second variable and an associated second weighting factor, the second variable indicative of a degree to which a single sentence of the summary summarizes an entirety of the given text. The numerical model also includes a third variable and an associated third weighting factor, the third variable indicative of a degree of copying in the summary of multi-word sequences present in the given text. A plurality of reference summaries for the given text are received, each reference summary having been given a reference score. The reference summaries span a range of reference scores reflecting varying degrees of comprehension of the subject matter of the given text. The reference summaries have been accepted as usable for training the numerical model. The numerical model is trained with the processing system using the reference summaries and the given reference scores to determine values for each of the first, second and third weighting factors. The numerical model is configured with the determined values of the first, second and third weighting factors to receive a first numerical measure, a second numerical measure and a third numerical measure for the first variable, second variable and third variable, respectively, of an actual summary to be scored so as to generate a score for the actual summary. The score for the actual summary is indicative of the user's comprehension of the subject matter of the text as presented in a summary of the text.

An example non-transitory computer-readable storage medium for constructing a numerical model to measure a user's comprehension of subject matter of a text as presented in a summary of the text constructed by a user includes computer executable instructions. When executed, the computer executable instructions cause a processing system to execute steps. In executing the steps, a numerical model associated with a given text is specified. The numerical model includes a first variable and an associated first weighting factor, the first variable indicative of a similarity between a summary of the given text constructed by a user and a given reference summary. The numerical model also includes a second variable and an associated second weighting factor, the second variable indicative of a degree to which a single sentence of the summary summarizes an entirety of the given text. The numerical model also includes a third variable and an associated third weighting factor, the third variable indicative of a degree of copying in the summary of multi-word sequences present in the given text. A plurality of reference summaries for the given text are received, each reference summary having been given a reference score. The reference summaries span a range of reference scores reflecting varying degrees of comprehension of the subject matter of the given text. The reference summaries have been accepted as usable for training the numerical model. The numerical model is trained with the processing system using the reference summaries and the given reference scores to determine values for each of the first, second and third weighting factors. The numerical model is configured with the determined values of the first, second and third weighting factors to receive a first numerical measure, a second numerical measure and a third numerical measure for the first variable, second variable and third variable, respectively, of an actual summary to be scored so as to generate a score for the actual summary. The score for the actual summary is indicative of the user's comprehension of the subject matter of the text as presented in a summary of the text.

BRIEF DESCRIPTION OF THE DRAWINGS

FIG. 2 depicts an example summarization task that is provided to a user.

FIG. 4 depicts an example grading rubric used by a human grader in grading a summary of a text.

DETAILED DESCRIPTION

Figure 1:
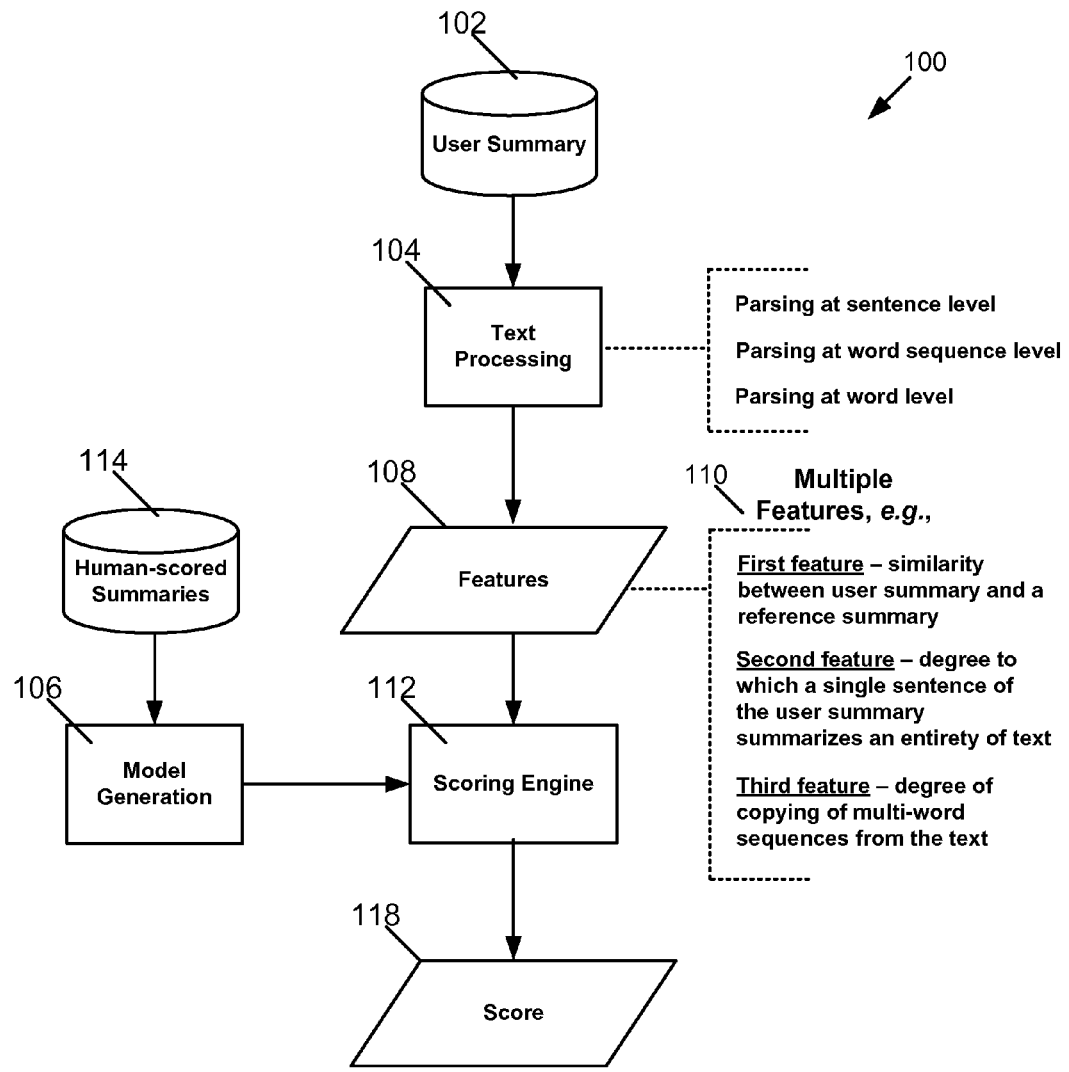
FIG. 1 is a block diagram illustrating an example system for measuring a user's reading comprehension of subject matter of a text.

FIG. 1 is a block diagram 100 illustrating an example system for measuring a user's reading comprehension of subject matter of a text. To measure the user's reading comprehension, the example system of FIG. 1 comprises a computer-based system for automatically scoring a summary 102 generated by the user, where the summary 102 is a constructed response that summarizes the text. In an example, the summary 102 is provided by the user in response to a summarization task. The summarization task presents a text to the user, e.g., a descriptive passage of several paragraphs for instance, and requests that the user generate a constructed response that summarizes the text. In the example, the user is a human that generates the summary 102.

To read for understanding, the user utilizes his or her abilities to i) learn and process visual and typographical elements and conventions of printed texts; ii) learn and process verbal elements of language including grammatical structures and word meanings; iii) form coherent mental model representations of texts, consistent with discourse, text structures, and genres of print; iv) model and reason about conceptual content; and v) model and reason about social content. Such abilities may facilitate an understanding of the structure and organization of the text and may facilitate the user's ability to determine structure within the text and make knowledge-based inferences. The summarization task presented to the user is utilized in assessing one or more of these abilities. Specifically, the summary 102 generated by the user may be used in assessing the user's reading comprehension of the subject matter of the text because the summary 102 evidences the user's ability to determine important ideas from the text, distinguish accurate information from opinions, and reflect the structure of the text.

The summary 102 generated by the user is received at a text processing module 104 of the computer-based system. Text processing performed on the summary 102 at the text processing module 104 may include parsing the summary 102 at a sentence level to extract sentences included in the summary 102, parsing the summary 102 at a word sequence level to extract word sequences included in the summary 102, and/or parsing the summary 102 at a word level to extract individual words included in the summary 102. Such parsing may be carried out using conventional automated, computer-based text parsing algorithms known to those of ordinary skill in the art. Various other processing and analysis may be performed on the summary 102 at the text processing module 104 (e.g., correction of spelling errors, correction of grammar errors, etc.), using conventional automated, computer-based algorithms known to those of ordinary skill in the art. The use of grammar correction and/or spelling correction algorithms can be beneficial to improve the quality of the content assessment being carried out by reducing the likelihood of complications in content assessment by the presence of grammar or spelling errors.

In an example, when parsing the summary 102 at the word sequence level, the parsing can be used to identify specific word n-grams of the summary 102 to create a collection of word n-grams, i.e., 1-grams, 2-grams, 3-grams, etc. Statistical information regarding the identified word n-gram collection (e.g., a count for each n-gram or frequency of occurrence) may be identified as well. The n-gram data determined from the processing may be stored in a database, which may typically be in the form of a table or index, such that a given record (or row of the table) has a field containing data representing the word n-gram and another field containing data representing the count or frequency for that word n-gram. The identified n-gram data can include more than just word sequences and can also include, for instance, information regarding symbols, punctuation, or other linguistic sequences with meaning but not conventionally characterized as words. Additionally, the n-gram collection may be "cleaned" (e.g., filtered) to remove any sequences, words, or characters that are not desired (e.g., certain punctuation, words like "a," "an," and "the," etc.). In other examples, rather than cleaning the n-gram collection, a "skip parser" may be used to skip certain words or word sequences of the summary 102 during the parsing. The need for the cleaning or the skip parsing in such examples reflects the fact that the summary 102 may include noise, unexpected grammatical constructions, etc., that may not be useful in scoring the summary 102. Conventional cleaning techniques, skip parsing techniques, or similar other techniques may be applied in an analogous manner to the parsing or processing of sentences and individual words of the summary 102.

The text processing and analysis performed at the text processing module 104 is used to extract one or more features 108 from the summary 102. In an example, the one or more features 108 include numerical measures or Boolean values that are representative of aspects of the summary 102. The text processing module 104 may extract example features 110 from the summary 102. The example features 110 may include the first, second, and third features illustrated in FIG. 1. As shown in FIG. 1, the first example feature indicates a similarity between the summary 102 and a reference summary. The first feature is determined by processing the summary 102 and the reference summary with a processing system to determine a numerical measure of similarity for the first feature. The reference summary may be a "model" summary that demonstrates an excellent understanding of both global concepts and local concepts within the text and thus has been designated as representative of the subject matter of the text. Further, the first feature may be determined by measuring a lexical and phrasal overlap between the summary 102 and the reference summary. Any suitable approach for determining similarity may be used in this regard such as vector-based methods conventionally known to those of ordinary skill in the art.

The second example feature of the example features 110 indicates a degree to which a single sentence of the summary 102 summarizes an entirety of the text. The second feature is determined by processing the summary 102 with the processing system to determine a numerical measure for the second feature. In an example, the summarization task assesses whether a first sentence of the summary 102 summarize the entirety of the text. Specifically, determining the second feature of the summary 102 may include determining a number of sentences of the text from which the single sentence of the summary 102 copies two-word or longer sequences, for instance.

The third example feature of the example features 110 indicates a degree of copying in the summary 102 of multi-word sequences present in the text. The third feature is determined by processing the summary 102 and the text with the processing system to determine a numerical measure for the third feature. As described in greater detail below, in an example, the third feature may be based on a plurality of different metrics that each indicate the degree of copying in the summary 102.

The text processing module 104 may extract features other than the example features 110. The other features extracted from the summary 102 may include i) a fourth feature indicating a length of the summary 102, ii) a fifth feature indicating a correspondence between a number of sentences in the summary 102 and a number of paragraphs in the text, or iii) a sixth feature indicating a degree to which different pieces of discourse within the summary 102 are logically and coherently connected.

The one or more features 108 extracted from the summary 102 are received at a scoring engine 112. The scoring engine 112 includes an automated scoring system configured to determine a score 118 for the summary 102 that measures the user's comprehension of the subject matter of the text. In an example, the automated scoring system is a computer-based system for automatically scoring the summary 102 that requires no human intervention or minimal human intervention. The scoring engine 112 may determine the score 118 for the summary 102 based on the features 108 extracted from the summary 102 and a scoring model. The scoring model includes weighting factors for the extracted features 108, and the weighting factors are determined based on a plurality of human-scored summaries 114. The scoring model may also be referred to as a "scoring equation."

The scoring model may be a numerical model that is applied to the extracted features 108 to determine the score 118. In an example, where the first, second, and third features 110 are extracted from the summary 102, the numerical scoring model includes a first variable and an associated first weighting factor, a second variable and an associated second weighting factor, and a third variable and an associated third weighting factor. The first variable receives a value of the first feature, the second variable receives a value of the second feature, and the third variable receives a value of the third feature. By applying the numerical scoring model to the first, second, and third features in this manner, the score 118 for the summary 102 that is indicative of the user's comprehension of the subject matter of the text is determined.

To generate the scoring model used in the scoring engine 112, a model generation module 106 may be used. The model generation module 106 receives the plurality of human-scored summaries 114 with associated scores for each of the summaries and uses the plurality of human-scored summaries 114 to determine the weighting factors for the model, e.g., through a regression analysis The plurality of human-scored summaries 114 span a range of reference scores reflecting varying degrees of comprehension of the subject matter of the text, and the summaries 114 are scored summaries that have been accepted as usable for training the scoring model. In an example, the weighting factors of the model are determined via a machine learning application trained based on the plurality of human-scored summaries 114. Specifically, the machine learning application may be a logistic regression classifier. As illustrated in FIG. 1, the model generation module 106 provides the model to the scoring engine 112, and the scoring engine 112 uses the model to generate the score 118 for the summary 102, as explained above.

With the scoring model in place, the summary 102 may be scored by applying the scoring model as noted above. The score 118 for the summary 102 measures the user's reading comprehension of the subject matter of the text. The score 118 may reflect the user's ability to form a coherent mental understanding of the text that is consistent with a meaning of the text. The ability to form the mental understanding of the text utilizes the user's knowledge of rhetorical text structures and genres; utilizes the user's ability to understand the propositional content of the text within the rhetorical structure, both from an author's perspective and the user's perspective; and is dependent on the user having acquired mental understanding for a variety of genres, each embodying specific strategies for understanding the meaning of the text to achieve reading goals. The score 118 that reflects the user's ability to form the coherent mental understanding may further evidence the user's reading comprehension of the subject matter of the text.

Alternative conventional systems for determining the user's reading comprehension of the subject matter of the text include assessments that have the user (a) sample global concepts of the text by asking the user to describe a main idea or theme of the text, (b) find specific details in the text using locate- or retrieve-type questions, or (c) bridge gaps between different points in the text using inference questions. In these alternative systems and methods, the assessments may be based on multiple choice questions. In contrast to the alternative conventional systems, the example system of FIG. 1 for measuring the user's reading comprehension of the text requests that the user generate a constructed response that summarizes the text. The use of constructed responses that summarize the text measures and encourages reading comprehension, aids the user in improving his or her reading skills, and engages the user in building a mental model of the text. To avoid the need for human scoring of the user's summary 102, the automated scoring system described herein is used.

FIG. 2 depicts an example summarization task 200 that may be provided to a user. As described above with reference to FIG. 1, a computer-based system is used to automatically score a summary 102, where the summary 102 is a constructed response provided by the user in response to a summarization task. The summarization task 200 is an example of such a summarization task and includes a passage of text 202 and directions 204. As indicated in the directions 204, the example summarization task 200 requests that the user generate a constructed response that summarizes the passage of text 202 (e.g., "Please write a summary," as illustrated in FIG. 2).

The example summarization task 200 further requests that a first sentence of the constructed response summarize an entirety of the text (e.g., "The first sentence of your summary should be about the whole passage," as illustrated in FIG. 2). In this manner, the summarization task 200 requests that the first sentence identify the "global concept" of the passage of text 202. The example summarization task 200 also requests that a number of additional sentences be included in the constructed response following the first sentence, where the number of additional sentences is equal to a number of paragraphs included in the text 202 (e.g., "Then write 3 more sentences," as illustrated in FIG. 2). In other examples, a different number of paragraphs could be presented and a different number of summary-sentences could be requested.

The example summarization task 200 also requests that each of the additional sentences describe a single paragraph of the number of paragraphs included in the text 202, where the additional sentences each describe a different paragraph of the text 202 (e.g., "Each sentence should be about one of the paragraphs," as illustrated in FIG. 2). In this manner, the summarization task 200 requests that the additional sentences identify "local concepts" corresponding to main points of each paragraph of the text 202. The directions 204 of the example summarization task 200 may be configured in any suitable way in other examples to elicit evidence from the user that is used in performing automated scoring on the user's summary. For example, the particular directions 204 of FIG. 2 may be configured, specifically, to elicit evidence related to automated scoring of other features shown at reference numeral 552 of FIG. 5, which are described below in greater detail.

In other examples, the summarization task 200 may include less detailed instructions or more detailed instructions. For instance, the summarization task 200 may merely request that the user summarize the text 202 and not provide further directions. Alternatively, the summarization task 200 may include the directions 204 illustrated in FIG. 2 and also include additional instructions to the user. In an example, the summarization task 200 may be included within a larger reading comprehension assessment. In this example, as part of the assessment, the user (i) may answer multiple choice questions about the passage of text 202, and (ii) may write a summary of the text 202.

Figure 3:
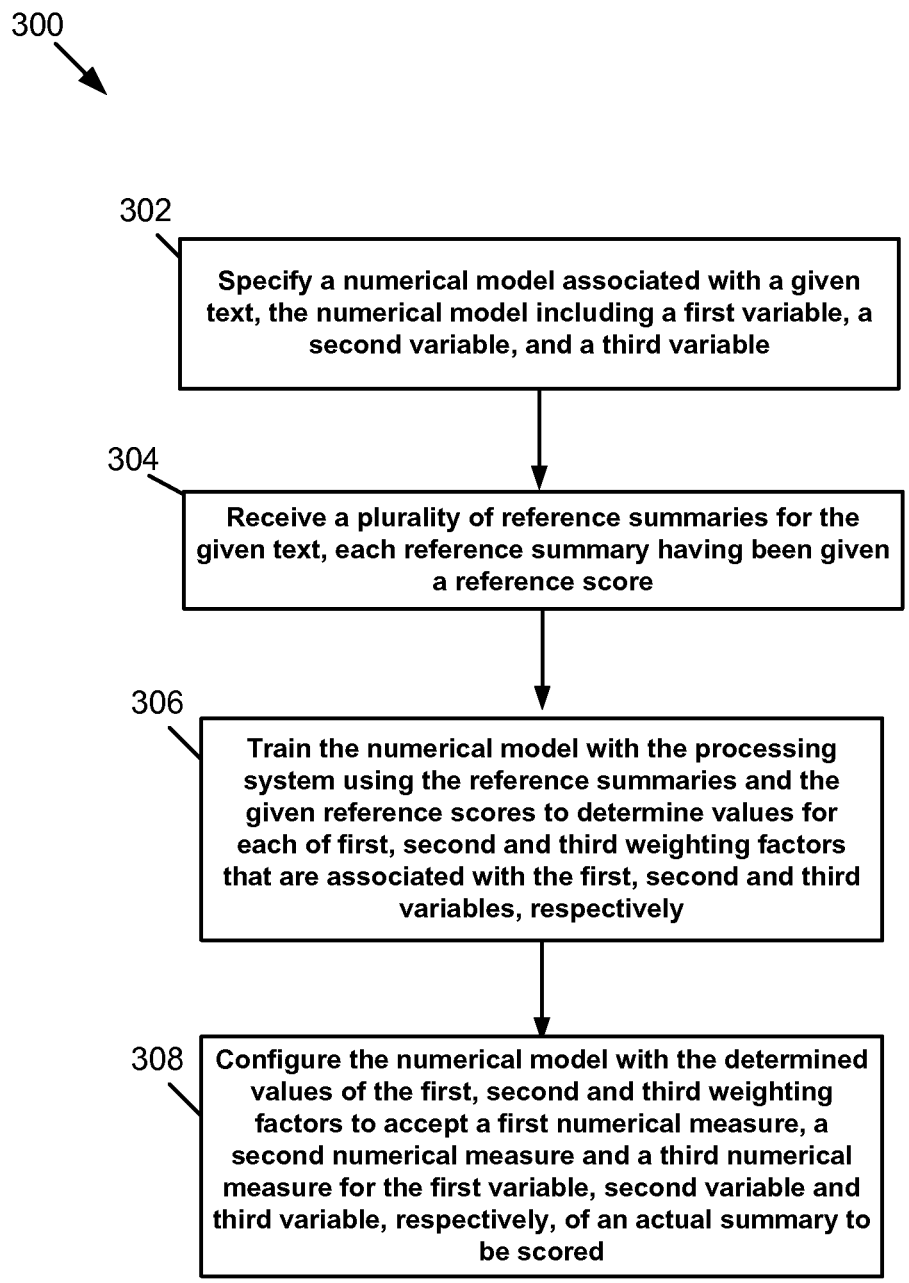
FIG. 3 is a flowchart depicting operations of an example method for constructing a numerical model to measure a user's comprehension of subject matter of a text as presented in a summary of the text constructed by a user.

FIG. 3 is a flowchart 300 depicting operations of an example method for constructing a numerical scoring model to measure a user's comprehension of subject matter of a text as presented in a summary of the text constructed by a user. As described above with reference to FIG. 1, a model generation module 106 receives the plurality of human-scored summaries 114 and uses the plurality of human-scored summaries 114 to determine weighting factors of the numerical model. The example operations depicted in the flowchart 300 of FIG. 3 provide further details on the building of such a numerical model.

At 302, a numerical model associated with a given text is specified. The numerical model includes a first variable and an associated first weighting factor, where the first variable indicates a similarity between a summary of the given text constructed by a user and a given reference summary. The numerical model also includes a second variable and an associated second weighting factor, where the second variable indicates a degree to which a single sentence of the summary summarizes an entirety of the given text. The numerical model also includes a third variable and an associated third weighting factor, where the third variable indicates a degree of copying in the summary of multi-word sequences present in the given text. In other examples, the numerical model includes additional variables and weighting factors, fewer variables and weighting factors, or different variables and weighting factors. For instance, the numerical model may include variables and weighting factors that are based on one or more features of features 552 of FIG. 5 (described in further detail below).

At 304, a plurality of reference summaries for the given text are received, where each reference summary has been given a reference score. The reference summaries span a range of reference scores reflecting varying degrees of comprehension of the subject matter of the given text, and the reference summaries are summaries that have been accepted as usable for training the numerical model. In an example, the reference scores given to the plurality of reference summaries are assigned by one or more human graders. The scores assigned by the one or more human graders may be points scores (e.g., 87 points out of 110 points possible), or they may be percentage or decimal scores (e.g., 95% correct). The scores assigned by the one or more human graders may alternatively be based on a grading rubric, such as the example grading rubric 400 of FIG. 4.

With reference to FIG. 4, the example grading rubric 400 may be based on holistic criteria rather than criteria based on specific dimensions of writing a summary. The example grading rubric 400 is designed for a passage of text that includes three paragraphs, where each of the three paragraphs includes a "local concept" corresponding to a main point of the paragraph. An example of such a passage of text including three paragraphs is illustrated in FIG. 2 at 202.

The example grading rubric 400 is based on a five point scale, as illustrated in FIG. 4. To receive a score of "4" (i.e., a highest score), a summary should demonstrate excellent global understanding and understanding of all three local concepts from the passage of the text, not include verbatim text of five or more words copied from the passage, and contain no inaccuracies. To receive a score of "3," a summary should demonstrate good global understanding, demonstrate understanding of at least two local concepts, include or not include verbatim text of five or more words copied from the passage, and contain no more than one inaccuracy. To receive a score of "2," a summary should demonstrate moderate local understanding only (e.g., understanding of two or three local concepts but not a global concept), include or not include verbatim text of five or more words copied from the passage, and contain no more than one inaccuracy. Alternatively, to receive a score of "2," a summary should demonstrate good global understanding only and no understanding of local concepts.

As is further illustrated in the example grading rubric 400 of FIG. 4, to receive a score of "1," a summary should demonstrate minimal local understanding (e.g., one local concept only) and include or not include verbatim text of five or more words copied from the passage. Alternatively, to receive a score of "1," a summary should contain only verbatim text copied from the passage. To receive a score of "0," a summary should be off topic, garbage, or demonstrate no understanding of the text. Alternatively, to receive a score of "0," the summary should include a response of "I don't know" or "IDK." In an example, in using the example grading rubric 400, the human grader is instructed to not score a summary lower based on the summary's inclusion of spelling or grammar errors. When writing a summary to be graded according to the example grading rubric 400, a user may be allowed or not allowed to view the passage of text that he or she is summarizing.

With reference again to FIG. 3, at 306, the numerical scoring model is trained with the processing system using the reference summaries and the given reference scores to determine values for each of the first, second and third weighting factors. As explained above, in other examples, the numerical model may include additional variables and weighting factors, fewer variables and weighting factors, or different variables and weighting factors. Thus, the training of the numerical scoring model is used to determine values for the particular weighting factors that are being used with the numerical model, which may include the first, second, and third weighting factors or other weighting factors.

The training of the numerical model may include processing each of the reference summaries to determine for each reference summary a first numerical measure, a second numerical measure, and a third numerical measure. The first numerical measure indicates a similarity between the summary and a particular reference summary, where the particular reference summary has been designated as representative of the subject matter of the text. The second numerical measure indicates a degree to which a single sentence of the reference summary summarizes an entirety of the text. The third numerical measure indicates a degree of copying in the reference summary of multi-word sequences present in the text. The training of the numerical scoring model may further include conducting a numerical regression analysis based on the first, second and third numerical measures and reference score for each of the plurality of reference summaries to determine the first, second and third weighting factors.

In the example of FIG. 3, the scoring model is trained based on the plurality of reference summaries that summarize the particular given text, and the scoring model is intended to be used thereafter in scoring summaries that summarize the given text. In this manner, the scoring model trained in the example of FIG. 3 may be passage specific. In other examples, however, the scoring model may be trained using data that does not relate to the given text, and the model may thereafter be used to score summaries that do not summarize the given text. Such a scoring model is not passage specific.

A machine learning approach may be used to build and train the scoring model. Specifically, in an example, a plurality of human-scored summaries are used, and features from the plurality of human-scored summaries are extracted. The extracted features may include features corresponding to the first, second, and third numerical measures described above with reference to FIG. 3, or the extracted features may include one or more of features 552 described below with reference to FIG. 5. The extracted features may be combined in a logistic regression classifier, which uses the extracted features and the scores for the plurality of human-scored summaries to generate weighting factors for the features. An example logistic regression classifier that may be used is the Weka Toolkit.

In an example, the scoring model was trained using summaries written by more than 2,600 students from 6th, 7th, and 9th grades, where certain of the summaries summarized a first passage of text, and certain of the summaries summarized a second passage of text. Specifically, in the example, a total of 2,695 summaries were used, where 1016 summaries were written about a first passage and 1679 summaries were written about a second passage. In this example, each summary was scored by a single human grader. In other examples, summaries are scored by two human graders.

At 308, the numerical scoring model is configured with the determined values of the first, second and third weighting factors. The scoring model is then ready to be used for scoring, i.e., to receive a first numerical measure, a second numerical measure and a third numerical measure for the first variable, second variable and third variable, respectively, of an actual summary to be scored so as to generate a score for the actual summary to be scored from a user. As noted previously, the score for the actual summary is indicative of the user's comprehension of the subject matter of the given text as presented in a summary of the given text. In this manner, the numerical model is thereafter configured to perform automated scoring on new summaries that need to be scored.

Figure 5:
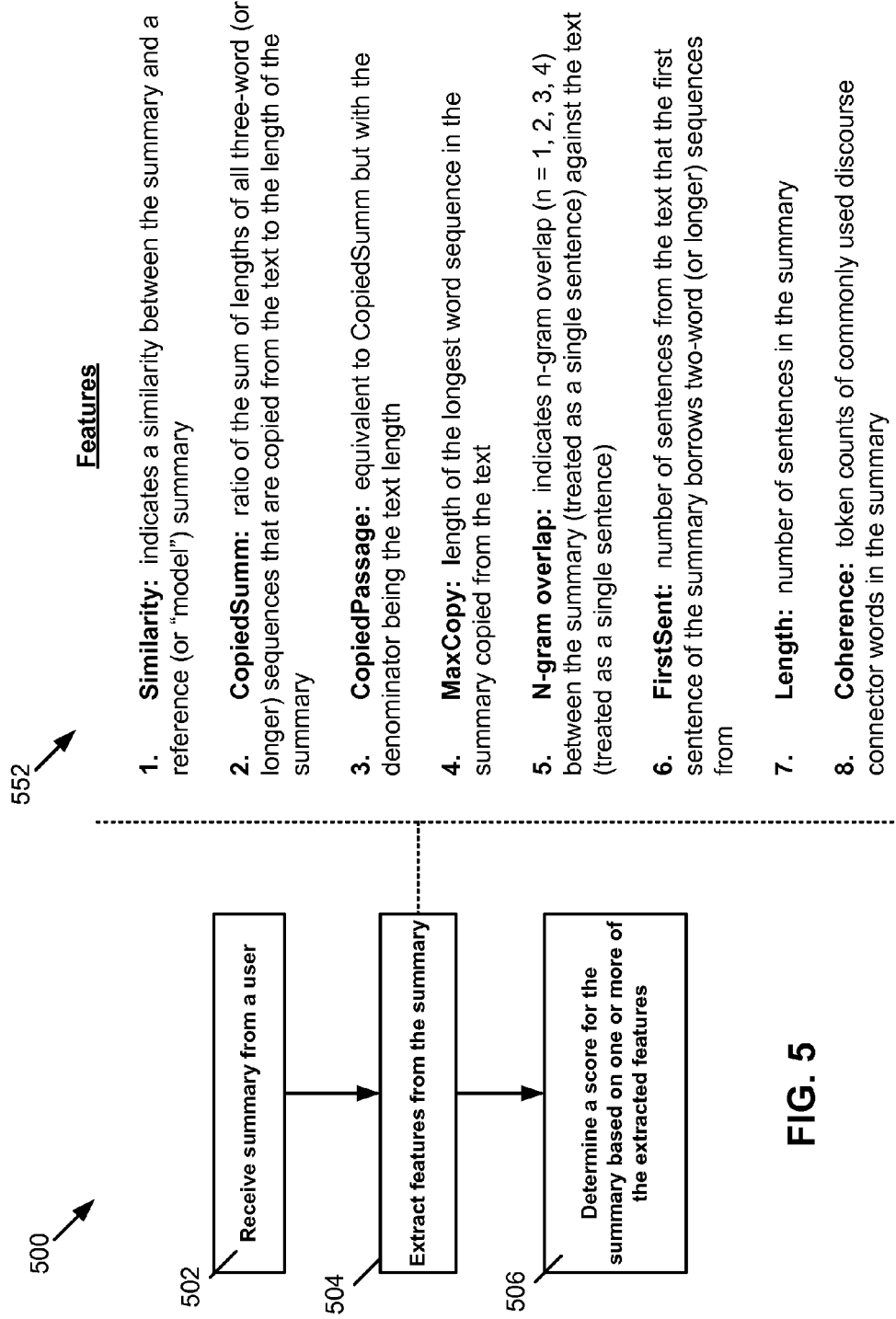
FIG. 5 depicts a flowchart including example steps for measuring a user's comprehension of subject matter of a text and example features that are extracted from a summary of the text generated by the user.

FIG. 5 depicts a flowchart 500 including example steps for measuring a user's comprehension of subject matter of a text and example features 552 that are extracted from a summary of the text generated by the user. At 502, the summary is received from the user, where the summary is a constructed response that summarizes the text. The constructed response may be provided by the user in response to a summarization task (e.g., the summarization task 200 of FIG. 2). In the summarization task, the user may be explicitly told to refrain from copying large portions of the text verbatim into his or her summary. In another example, the user is not explicitly told to refrain from copying large portions of the text verbatim into his or her summary but the instructions may indicate this implicitly by requesting, for example, that the sentences of the summary be "about" the whole passage or be "about" one of the paragraphs (e.g., "The first sentence . . . should be about the whole passage . . . . Each [additional] sentence should be about one of the paragraphs."). At 504, one or more features are extracted from the summary. The extracted features may be numerical measures that are determined by processing the summary, a reference summary, or the text with a processing system, as described above with reference to FIG. 1.

The one or more features extracted may include features from the example features 552 of FIG. 5. A first feature, "Similarity," indicates a similarity between the summary and a reference summary. In an example, the first feature is based on the Recall-Oriented Understudy for Gisting Evaluation (ROUGE) metric, which is an automated metric produced by an automated document summarization system known to those of ordinary skill in the art. The ROUGE metric is a recall-based metric that measures a lexical and phrasal overlap between the summary under consideration and a set of "model" (or reference) summaries. A single model summary may be used with the ROUGE metric, and the single model summary may be a summary given a score of "4" based on the example grading rubric 400 of FIG. 4. Various methods may be used to determine the "Similarity" feature. In an example, a vector-based similarity calculation between text segments of the summary and text segments of the reference summary is used to measure similarity.

Second, third, fourth, and fifth features of the features 552 of FIG. 5 indicate an amount of material from the text that is included in the summary. Specifically, the second, third, fourth, and fifth features may capture verbatim copying of the text within the user's summary. The second feature, "CopiedSumm," is a ratio between a first value and a second value, where the first value is a sum of lengths of all three-word or longer phrases from the text that are included in the summary, and where the second value is a length of the summary. The third feature, "CopiedPassage," is a ratio between the first value and a third value, where the third value is a length of the text. The fourth feature, "MaxCopy," indicates a length of a longest word sequence from the text that is included in the summary.

The fifth feature of the features 552 of FIG. 5, "N-gram overlap," indicates a number of words and a number of phrases from the text that are included in the summary. The fifth feature may be a precision metric that computes n-gram overlap (n=1, . . . , 4) between the summary (treated as a single sentence) and the text (treated as a single sentence). In an example, the fifth feature is based on the Bilingual Evaluation Understudy (BLEU) algorithm known to those of ordinary skill in the art. The BLEU algorithm measures how many words and phrases are copied directly from the text into the summary.

The sixth feature of the features 552 of FIG. 5, "First-Sent," indicates a degree to which a single sentence of the summary summarizes an entirety of the text. The sixth feature thus captures a "global understanding" evidenced in the single sentence, such that a large value for the sixth feature indicates that the single sentence captures concepts from the entirety of the text. In an example, the single sentence is a first sentence of the summary, and the sixth feature is based on a number of sentences of the text from which the first sentence copies two-word or longer sequences. In this example, the summarization task explicitly requests that the first sentence of the summary summarizes the entirety of the text, as illustrated in the example summarization task 200 of FIG. 2.

The seventh feature of the features 552 of FIG. 5, "Length," indicates a length of the summary. The seventh feature may be based on a number of sentences in the summary. For instance, in the example summarization task 200 of FIG. 2, the summarization task 200 requests that the summary include a number of additional sentences following a first sentence, where the number of additional sentences is equal to the number of paragraphs included in the text (e.g., as illustrated in the example summarization task 200 of FIG. 2). In this example, the seventh feature indicates a correspondence between the number of additional sentences and the number of paragraphs of the text.

The eighth feature of the features 552 of FIG. 5, "Coherence," indicates a degree to which different pieces of discourse within the summary are logically connected. In an example, the eighth feature is determined by determining token counts of a number of discourse markers included in the summary. Such discourse markers indicate how well the user is able to connect different local concepts present in the text.

Additional features not included in the features 552 of FIG. 5 may be used in other examples. For example, the first feature, described above as indicating an amount of verbatim copying between the summary and a reference summary, may be modified in examples to also be indicative of paraphrasing or the inclusion of similar ideas between the summary and the reference summary. Specifically, the "Translation-Edit-Rate Plus" (TERp) metric known to those of ordinary skill in the art, which is able to capture and reward paraphrasing in addition to verbatim matches, may be used. In other examples, vector-based methods for determining semantic similarity between the summary and the reference summary are used (e.g., Content Vector Analysis, Random Indexing, etc.). In another example, additional features are used to better determine the user's inclusion of "local concepts" from the text within his or her summary.

At 506, a score for the summary is determined using the scoring model based on the one or more features that are extracted from the summary. The score measures the user's comprehension of the subject matter of the text.

Figure 6:
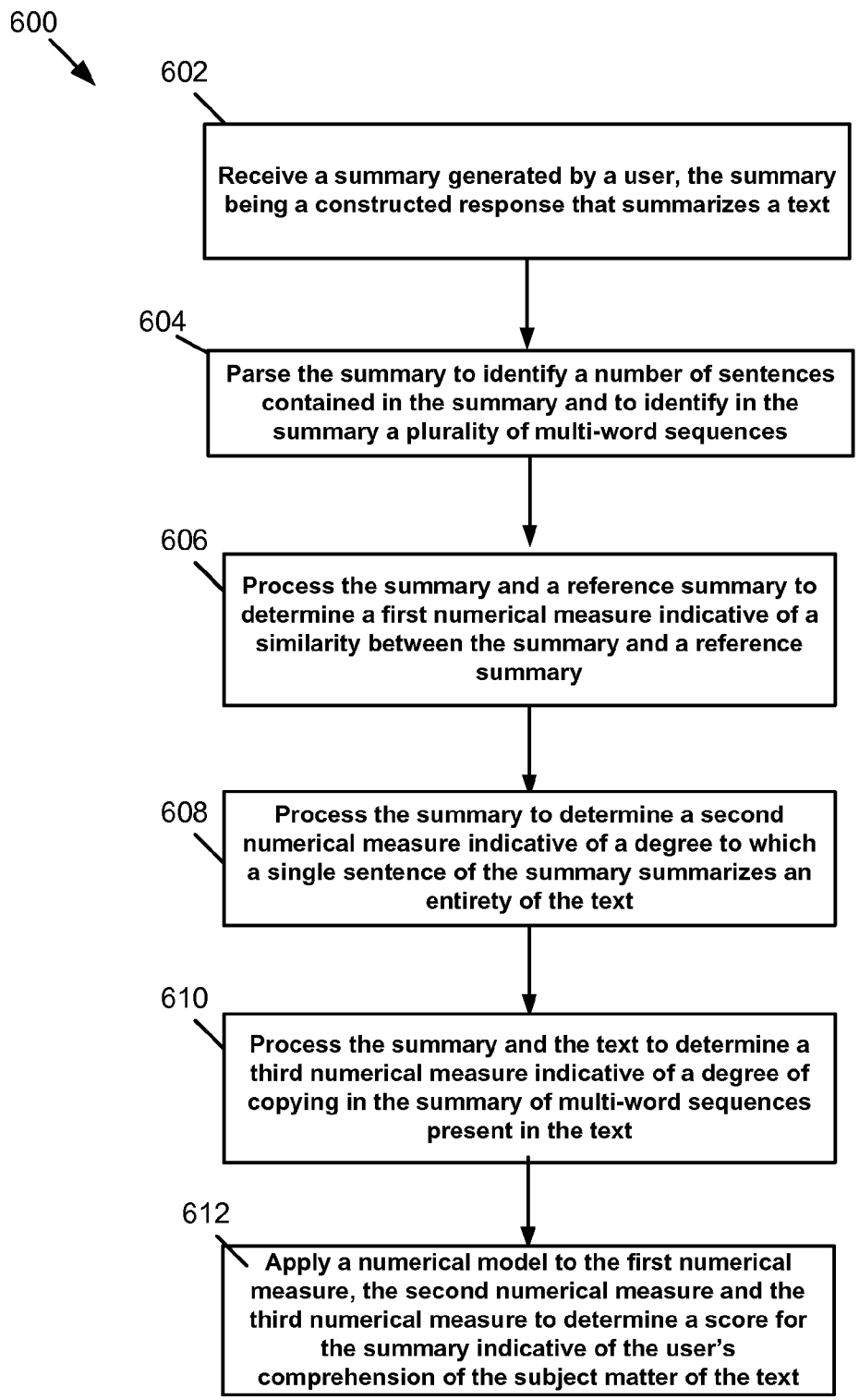
FIG. 6 is a flowchart depicting operations of an example computer-implemented method of measuring a user's comprehension of subject matter of a text.

FIG. 6 is a flowchart 600 depicting operations of an example computer-implemented method of measuring a user's comprehension of subject matter of a text. At 602, a summary generated by the user is received, where the summary is a constructed response that summarizes the text. At 604, the summary is parsed with a processing system to identify a number of sentences contained in the summary and to identify in the summary a plurality of multi-word sequences. At 606, the summary and a reference summary are processed with the processing system to determine a first numerical measure indicative of a similarity between the summary and a reference summary, where the reference summary has been designated as representative of the subject matter of the text. At 608, the summary is processed with the processing system to determine a second numerical measure indicative of a degree to which a single sentence of the summary summarizes an entirety of the text. At 610, the summary and the text are processed with the processing system to determine a third numerical measure indicative of a degree of copying in the summary of multi-word sequences present in the text. At 612, a numerical scoring model is applied to the first numerical measure, the second numerical measure and the third numerical measure to determine a score for the summary indicative of the user's comprehension of the subject matter of the text. The numerical scoring model includes a first variable and an associated first weighting factor, the first variable receiving a value of the first numerical measure. The numerical scoring model also includes a second variable and an associated second weighting factor, the first variable receiving a value of the second numerical measure. The numerical scoring model further includes a third variable and an associated third weighting factor, the third variable receiving a value of the third numerical measure.

Figure 7A:
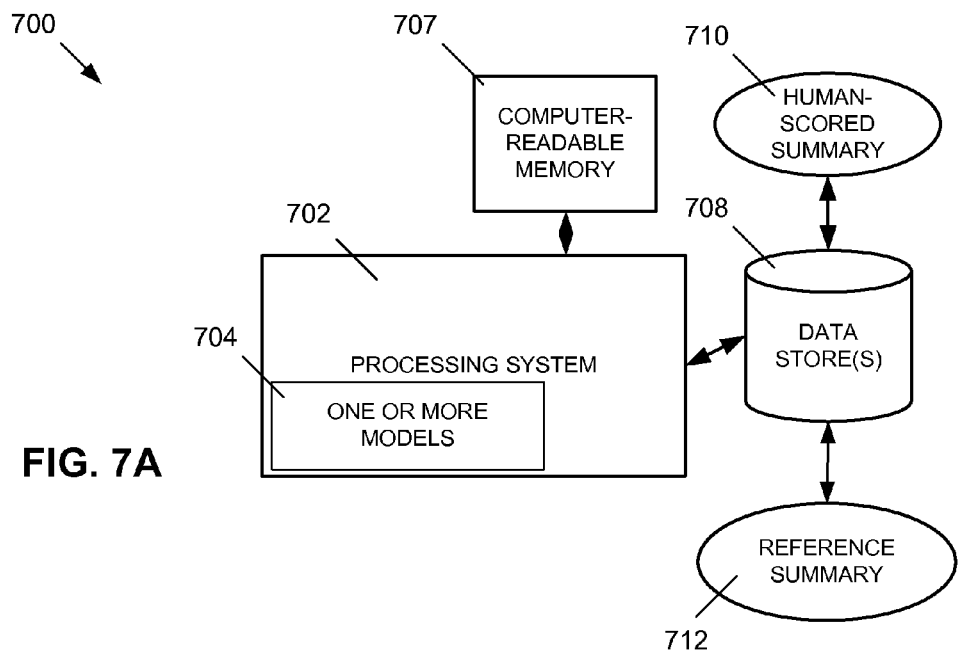
FIGS. 7A, 7B, and 7C depict example systems for measuring a user's reading comprehension of subject matter of a text.
Figure 7B:
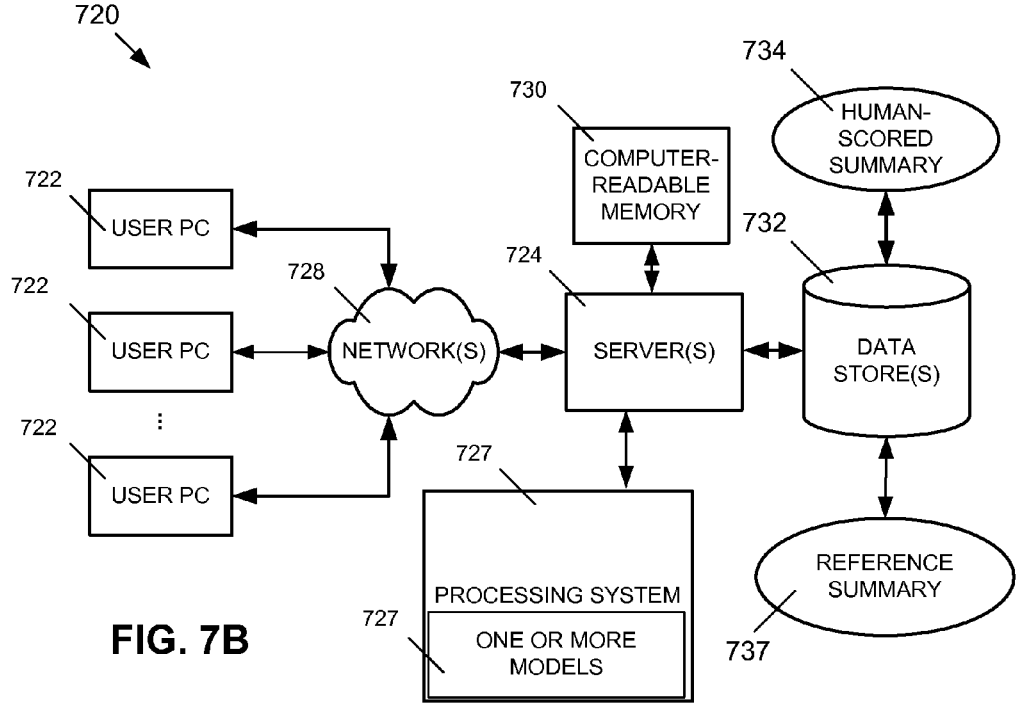
Figure 7C:
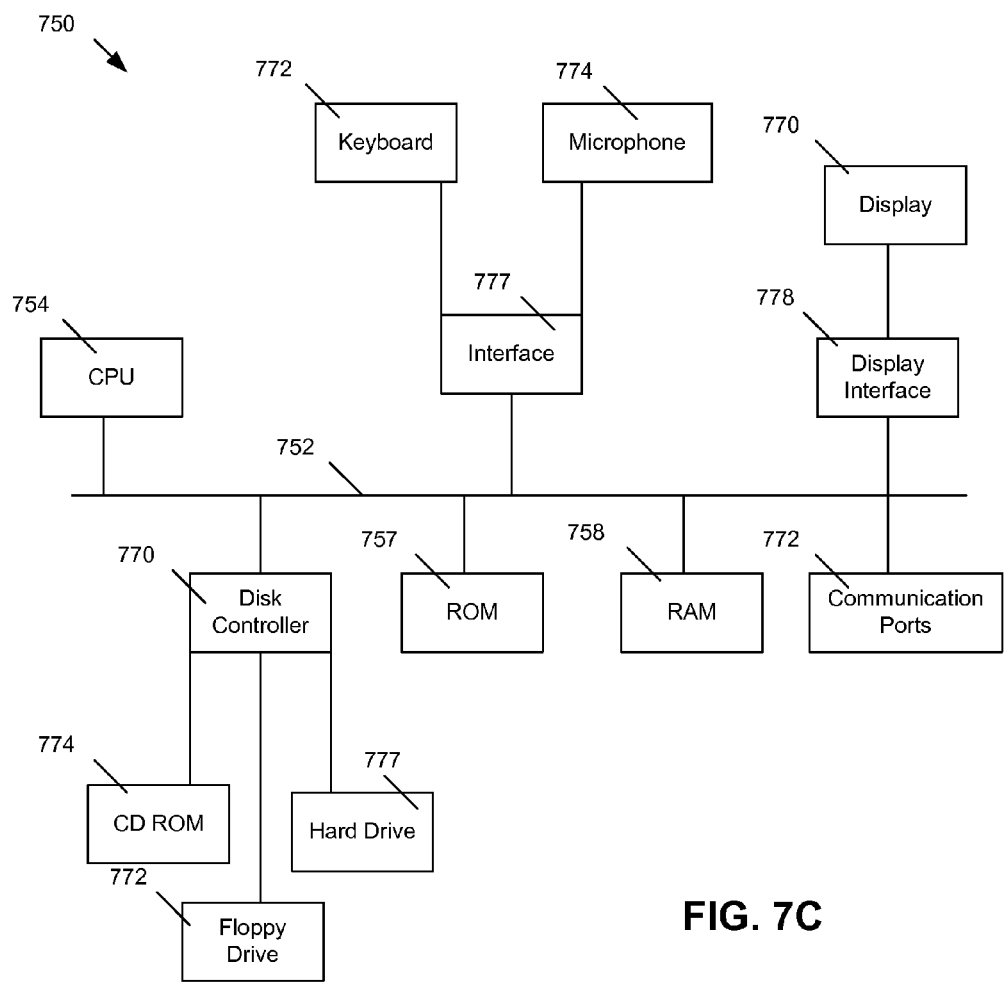

FIGS. 7A, 7B, and 7C depict example systems for measuring a user's reading comprehension of subject matter of a text. For example, FIG. 7A depicts an exemplary system 700 that includes a standalone computer architecture where a processing system 702 (e.g., one or more computer processors located in a given computer or in multiple computers that may be separate and distinct from one another) includes one or more models 704 being executed on the processing system 702. The processing system 702 has access to a computer-readable memory 706 in addition to one or more data stores 708. The one or more data stores 708 may include human-scored summaries 710 as well as reference summaries 712. The processing system 702 may be a distributed parallel computing environment, which may be used to handle very large-scale data sets.

FIG. 7B depicts a system 720 that includes a client-server architecture. One or more user PCs 722 access one or more servers 724 running one or more models 726 on a processing system 727 via one or more networks 728. The one or more servers 724 may access a computer-readable memory 730 as well as one or more data stores 732. The one or more data stores 732 may contain human-scored summaries 734 as well as reference summaries 736.

FIG. 7C shows a block diagram of exemplary hardware for a standalone computer architecture 750, such as the architecture depicted in FIG. 7A that may be used to contain and/or implement the program instructions of system embodiments of the present disclosure. A bus 752 may serve as the information highway interconnecting the other illustrated components of the hardware. A processing system 754 labeled CPU (central processing unit) (e.g., one or more computer processors at a given computer or at multiple computers), may perform calculations and logic operations required to execute a program. A non-transitory processor-readable storage medium, such as read only memory (ROM) 756 and random access memory (RAM) 758, may be in communication with the processing system 754 and may contain one or more programming instructions for performing the method for measuring the user's reading comprehension of the subject matter of the text. Optionally, program instructions may be stored on a non-transitory computer-readable storage medium such as a magnetic disk, optical disk, recordable memory device, flash memory, or other physical storage medium.

In FIGS. 7A, 7B, and 7C, computer readable memories 706, 730, 756, 758 or data stores 708, 732, 762, 764, 766 may include one or more data structures for storing and associating various data used in the example systems for measuring a user's reading comprehension of subject matter of a text. For example, a data structure stored in any of the aforementioned locations may be used to associate numerical measures of features and evidence of such numerical measures within a scored summary. As another example, a data structure may be used to relate variables of a numerical scoring model with associated weighting factors. Other aspects of the example systems for measuring a user's comprehension of subject matter of a text may be stored and associated in the one or more data structures (e.g., numerical measures, scores for human-scored reference summaries, etc.).

A disk controller 760 interfaces one or more optional disk drives to the system bus 752. These disk drives may be external or internal floppy disk drives such as 762, external or internal CD-ROM, CD-R, CD-RW or DVD drives such as 764, or external or internal hard drives 766. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 760, the ROM 756 and/or the RAM 758. The processor 754 may access one or more components as required.

A display interface 768 may permit information from the bus 752 to be displayed on a display 770 in audio, graphic, or alphanumeric format. Communication with external devices may optionally occur using various communication ports 772.

In addition to these computer-type components, the hardware may also include data input devices, such as a keyboard 773, or other input device 774, such as a microphone, remote control, pointer, mouse and/or joystick.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

It is claimed:

1. A computer-implemented method of measuring a user's comprehension of subject matter of a text, the method comprising:
    receiving a summary generated by the user, the summary being a constructed response that summarizes a text;
    parsing the summary with a processing system to identify a number of sentences contained in the summary and to identify in the summary a plurality of multi-word sequences;
    processing the summary and a reference summary with the processing system to determine a first numerical measure indicative of a similarity between the summary and a reference summary, the reference summary having been designated as representative of the subject matter of the text;
    processing the summary with the processing system to determine a second numerical measure indicative of a degree to which a single sentence of the summary summarizes an entirety of the text;
    processing the summary and the text with the processing system to determine a third numerical measure indicative of a degree of copying in the summary of multi-word sequences present in the text; and
    applying a numerical model to the first numerical measure, the second numerical measure and the third numerical measure to determine a score for the summary indicative of the user's comprehension of the subject matter of the text, the numerical model including
        a first variable and an associated first weighting factor, the first variable receiving a value of the first numerical measure,
        a second variable and an associated second weighting factor, the first variable receiving a value of the second numerical measure, and
        a third variable and an associated third weighting factor, the third variable receiving a value of the third numerical measure.

2. The computer-implemented method of claim 1, wherein the determining of the third numerical measure includes:
    determining a first metric for the summary, the first metric being a ratio between a first value and a second value, wherein the first value is a sum of lengths of all three-word or longer phrases from the text that are included in the summary, and wherein the second value is a length of the summary;

determining a second metric for the summary, the second metric being a ratio between the first value and a third value, wherein the third value is a length of the text; and determining a third metric for the summary, the third metric being a length of a longest word sequence from the text that is included in the summary.

3. The computer-implemented method of claim 1 comprising:

processing the summary with the processing system to determine a fourth numerical measure indicative of a length of the summary; and applying the numerical model to the fourth numerical measure to determine the score for the summary, the numerical model including a fourth variable and an associated fourth weighting factor, the fourth variable receiving a value of the fourth numerical measure.

4. The computer-implemented method of claim 1 comprising:

processing the summary with the processing system to determine a fourth numerical measure indicative of a number of discourse markers included in the summary; and applying the numerical model to the fourth numerical measure to determine the score for the summary, the numerical model including a fourth variable and an associated fourth weighting factor, the fourth variable receiving a value of the fourth numerical measure.

5. The computer-implemented method of claim 1, wherein the determining of the second numerical measure includes determining a number of sentences of the text from which the single sentence of the summary reproduces two-word or longer sequences.

6. A system for measuring a user's comprehension of subject matter of a text, the system comprising:

a processing system; and computer-readable memory in communication with the processing system encoded with instructions for commanding the processing system to execute steps comprising:

receiving a summary generated by the user, the summary being a constructed response that summarizes a text;

parsing the summary with the processing system to identify a number of sentences contained in the summary and to identify in the summary a plurality of multi-word sequences;

processing the summary and a reference summary with the processing system to determine a first numerical measure indicative of a similarity between the summary and a reference summary, the reference summary having been designated as representative of the subject matter of the text;

processing the summary with the processing system to determine a second numerical measure indicative of a degree to which a single sentence of the summary summarizes an entirety of the text;

processing the summary and the text with the processing system to determine a third numerical measure indicative of a degree of copying in the summary of multi-word sequences present in the text; and applying a numerical model to the first numerical measure, the second numerical measure and the third numerical measure to determine a score for the summary indicative of the user's comprehension of the subject matter of the text, the numerical model including a first variable and an associated first weighting factor, the first variable receiving a value of the first numerical measure, a second variable and an associated second weighting factor, the first variable receiving a value of the second numerical measure, and a third variable and an associated third weighting factor, the third variable receiving a value of the third numerical measure.

7. The system of claim 6, wherein the determining of the third numerical measure includes:

determining a first metric for the summary, the first metric being a ratio between a first value and a second value, wherein the first value is a sum of lengths of all three-word or longer phrases from the text that are included in the summary, and wherein the second value is a length of the summary;

determining a second metric for the summary, the second metric being a ratio between the first value and a third value, wherein the third value is a length of the text; and determining a third metric for the summary, the third metric being a length of a longest word sequence from the text that is included in the summary.

8. The system of claim 6, wherein the instructions command the processing system to execute the steps comprising:

processing the summary with the processing system to determine a fourth numerical measure indicative of a length of the summary; and applying the numerical model to the fourth numerical measure to determine the score for the summary, the numerical model including a fourth variable and an associated fourth weighting factor, the fourth variable receiving a value of the fourth numerical measure.

9. The system of claim 6, wherein the instructions command the processing system to execute the steps comprising:

processing the summary with the processing system to determine a fourth numerical measure indicative of a number of discourse markers included in the summary; and applying the numerical model to the fourth numerical measure to determine the score for the summary, the numerical model including a fourth variable and an associated fourth weighting factor, the fourth variable receiving a value of the fourth numerical measure.

10. The system of claim 6, wherein the determining of the second numerical measure includes determining a number of sentences of the text from which the single sentence of the summary reproduces two-word or longer sequences.

11. A non-transitory computer-readable storage medium for measuring a user's comprehension of subject matter of a text, the computer-readable storage medium comprising computer executable instructions which, when executed, cause a processing system to execute steps comprising:

receiving a summary generated by the user, the summary being a constructed response that summarizes a text;

parsing the summary with the processing system to identify a number of sentences contained in the summary and to identify in the summary a plurality of multi-word sequences;

processing the summary and a reference summary with the processing system to determine a first numerical measure indicative of a similarity between the summary and a reference summary, the reference summary having been designated as representative of the subject matter of the text;

processing the summary with the processing system to determine a second numerical measure indicative of a degree to which a single sentence of the summary summarizes an entirety of the text;

processing the summary and the text with the processing system to determine a third numerical measure indicative of a degree of copying in the summary of multi-word sequences present in the text; and applying a numerical model to the first numerical measure, the second numerical measure and the third numerical measure to determine a score for the summary indicative of the user's comprehension of the subject matter of the text, the numerical model including a first variable and an associated first weighting factor, the first variable receiving a value of the first numerical measure, a second variable and an associated second weighting factor, the first variable receiving a value of the second numerical measure, and a third variable and an associated third weighting factor, the third variable receiving a value of the third numerical measure.

12. The non-transitory computer-readable storage medium of claim 11, wherein the determining of the third numerical measure includes:

determining a first metric for the summary, the first metric being a ratio between a first value and a second value, wherein the first value is a sum of lengths of all three-word or longer phrases from the text that are included in the summary, and wherein the second value is a length of the summary;

determining a second metric for the summary, the second metric being a ratio between the first value and a third value, wherein the third value is a length of the text; and determining a third metric for the summary, the third metric being a length of a longest word sequence from the text that is included in the summary.

13. The non-transitory computer-readable storage medium of claim 11, wherein the computer executable instructions cause the processing system to execute the steps comprising:

processing the summary with the processing system to determine a fourth numerical measure indicative of a length of the summary; and applying the numerical model to the fourth numerical measure to determine the score for the summary, the numerical model including a fourth variable and an associated fourth weighting factor, the fourth variable receiving a value of the fourth numerical measure.

14. The non-transitory computer-readable storage medium of claim 11, wherein the computer executable instructions cause the processing system to execute the steps comprising:

processing the summary with the processing system to determine a fourth numerical measure indicative of a number of discourse markers included in the summary; and applying the numerical model to the fourth numerical measure to determine the score for the summary, the numerical model including a fourth variable and an associated fourth weighting factor, the fourth variable receiving a value of the fourth numerical measure.

15. The non-transitory computer-readable storage medium of claim 11, wherein the determining of the second numerical measure includes determining a number of sentences of the text from which the single sentence of the summary reproduces two-word or longer sequences.

16. A computer-implemented method of constructing a numerical model to measure a user's comprehension of subject matter of a text as presented in a summary of the text constructed by a user, the method comprising:

specifying a numerical model associated with a given text, the numerical model comprising a first variable and an associated first weighting factor, the first variable indicative of a similarity between a summary of the given text constructed by a user and a given reference summary, a second variable and an associated second weighting factor, the second variable indicative of a degree to which a single sentence of the summary summarizes an entirety of the given text, and a third variable and an associated third weighting factor, the third variable indicative of a degree of copying in the summary of multi-word sequences present in the given text;

receiving a plurality of reference summaries for the given text, each reference summary having been given a reference score, the reference summaries spanning a range of reference scores reflecting varying degrees of comprehension of the subject matter of the given text, the reference summaries having been accepted as usable for training the numerical model;

training the numerical model with a processing system using the reference summaries and the given reference scores to determine values for each of the first, second and third weighting factors; and configuring the numerical model with the determined values of the first, second and third weighting factors to receive a first numerical measure, a second numerical measure and a third numerical measure for the first variable, second variable and third variable, respectively, of an actual summary to be scored so as to generate a score for the actual summary that is indicative of the user's comprehension of the subject matter of the text as presented in a summary of the text.

17. The computer-implemented method of claim 16, wherein the training comprises:

processing each of the reference summaries to determine for each reference summary a first numerical measure indicative of a similarity between the summary and a particular reference summary, the particular reference summary having been designated as representative of the subject matter of the text, a second numerical measure indicative of a degree to which a single sentence of the reference summary summarizes an entirety of the text, and a third numerical measure indicative of a degree of copying in the reference summary of multi-word sequences present in the text; and conducting a numerical regression analysis based on the first, second and third numerical measures and reference score for each of the plurality of reference summaries to determine the first, second and third weighting factors.

18. The computer-implemented method of claim 17, wherein the determining of the third numerical measure for each reference summary includes:

determining a first metric for the reference summary, the first metric being a ratio between a first value and a second value, wherein the first value is a sum of lengths of all three-word or longer phrases from the text that are included in the reference summary, and wherein the second value is a length of the reference summary;

determining a second metric for the reference summary, the second metric being a ratio between the first value and a third value, wherein the third value is a length of the text; and determining a third metric for the reference summary, the third metric being a length of a longest word sequence from the text that is included in the reference summary.

19. A system for constructing a numerical model to measure a user's comprehension of subject matter of a text as presented in a summary of the text constructed by a user, the system comprising:

a processing system; and computer-readable memory in communication with the processing system encoded with instructions for commanding the processing system to execute steps comprising:

specifying a numerical model associated with a given text, the numerical model comprising
- a first variable and an associated first weighting factor, the first variable indicative of a similarity between a summary of the given text constructed by a user and a given reference summary,
- a second variable and an associated second weighting factor, the second variable indicative of a degree to which a single sentence of the summary summarizes an entirety of the given text, and
- a third variable and an associated third weighting factor, the third variable indicative of a degree of copying in the summary of multi-word sequences present in the given text;

receiving a plurality of reference summaries for the given text, each reference summary having been given a reference score, the reference summaries spanning a range of reference scores reflecting varying degrees of comprehension of the subject matter of the given text, the reference summaries having been accepted as usable for training the numerical model;

training the numerical model with the processing system using the reference summaries and the given reference scores to determine values for each of the first, second and third weighting factors; and configuring the numerical model with the determined values of the first, second and third weighting factors to receive a first numerical measure, a second numerical measure and a third numerical measure for the first variable, second variable and third variable, respectively, of an actual summary to be scored so as to generate a score for the actual summary that is indicative of the user's comprehension of the subject matter of the text as presented in a summary of the text.

20. The system of claim 19, wherein the training comprises:

processing each of the reference summaries to determine for each reference summary
- a first numerical measure indicative of a similarity between the summary and a particular reference summary, the particular reference summary having been designated as representative of the subject matter of the text,
- a second numerical measure indicative of a degree to which a single sentence of the reference summary summarizes an entirety of the text, and
- a third numerical measure indicative of a degree of copying in the reference summary of multi-word sequences present in the text; and conducting a numerical regression analysis based on the first, second and third numerical measures and reference score for each of the plurality of reference summaries to determine the first, second and third weighting factors.

21. The system of claim 20, wherein the determining of the third numerical measure for each reference summary includes:

determining a first metric for the reference summary, the first metric being a ratio between a first value and a second value, wherein the first value is a sum of lengths of all three-word or longer phrases from the text that are included in the reference summary, and wherein the second value is a length of the reference summary;

determining a second metric for the reference summary, the second metric being a ratio between the first value and a third value, wherein the third value is a length of the text; and determining a third metric for the reference summary, the third metric being a length of a longest word sequence from the text that is included in the reference summary.

22. A non-transitory computer-readable storage medium for constructing a numerical model to measure a user's comprehension of subject matter of a text as presented in a summary of the text constructed by a user, the computer-readable storage medium comprising computer executable instructions which, when executed, cause a processing system to execute steps comprising:

specifying a numerical model associated with a given text, the numerical model comprising
- a first variable and an associated first weighting factor, the first variable indicative of a similarity between a summary of the given text constructed by a user and a given reference summary,
- a second variable and an associated second weighting factor, the second variable indicative of a degree to which a single sentence of the summary summarizes an entirety of the given text, and
- a third variable and an associated third weighting factor, the third variable indicative of a degree of copying in the summary of multi-word sequences present in the given text;

receiving a plurality of reference summaries for the given text, each reference summary having been given a reference score, the reference summaries spanning a range of reference scores reflecting varying degrees of comprehension of the subject matter of the given text, the reference summaries having been accepted as usable for training the numerical model;

training the numerical model with the processing system using the reference summaries and the given reference scores to determine values for each of the first, second and third weighting factors; and configuring the numerical model with the determined values of the first, second and third weighting factors to receive a first numerical measure, a second numerical measure and a third numerical measure for the first variable, second variable and third variable, respectively, of an actual summary to be scored so as to generate a score for the actual summary that is indicative of the user's comprehension of the subject matter of the text as presented in a summary of the text.

23. The non-transitory computer-readable storage medium of claim 22, wherein the training comprises:

processing each of the reference summaries to determine for each reference summary
- a first numerical measure indicative of a similarity between the summary and a particular reference summary, the particular reference summary having been designated as representative of the subject matter of the text,
a second numerical measure indicative of a degree to which a single sentence of the reference summary summarizes an entirety of the text, and
a third numerical measure indicative of a degree of copying in the reference summary of multi-word sequences present in the text; and
conducting a numerical regression analysis based on the first, second and third numerical measures and reference score for each of the plurality of reference summaries to determine the first, second and third weighting factors.

24. The non-transitory computer-readable storage medium of claim 23, wherein the determining of the third numerical measure for each reference summary includes:
determining a first metric for the reference summary, the first metric being a ratio between a first value and a second value, wherein the first value is a sum of lengths of all three-word or longer phrases from the text that are included in the reference summary, and wherein the second value is a length of the reference summary;
determining a second metric for the reference summary, the second metric being a ratio between the first value and a third value, wherein the third value is a length of the text; and
determining a third metric for the reference summary, the third metric being a length of a longest word sequence from the text that is included in the reference summary.

25. A computer-implemented method of measuring a user's comprehension of subject matter of a text, the method comprising:
receiving a summary generated by the user, the summary being a constructed response that summarizes a text;
parsing the summary with a processing system to identify a number of sentences contained in the summary and to identify in the summary a plurality of multi-word sequences;
processing the summary and a reference summary with the processing system to determine a first numerical measure based on a lexical and phrasal overlap between the summary and a reference summary, the reference summary having been designated as representative of the subject matter of the text;
processing the summary with the processing system to determine a second numerical measure based on a number of sentences of the text from which a single sentence of the summary reproduces two-word or longer sequences;
processing the summary and the text with the processing system to determine a third numerical measure indicative of a degree of copying in the summary of multi-word sequences present in the text; and
applying a numerical model to the first numerical measure, the second numerical measure and the third numerical measure to determine a score for the summary indicative of the user's comprehension of the subject matter of the text, the numerical model including
a first variable and an associated first weighting factor, the first variable receiving a value of the first numerical measure,
a second variable and an associated second weighting factor, the first variable receiving a value of the second numerical measure, and
a third variable and an associated third weighting factor, the third variable receiving a value of the third numerical measure.

* * * * *